United States Patent
Nez et al.

(10) Patent No.: US 11,176,449 B1
(45) Date of Patent: Nov. 16, 2021

(54) NEURAL NETWORK ACCELERATOR HARDWARE-SPECIFIC DIVISION OF INFERENCE INTO GROUPS OF LAYERS

(71) Applicant: Edgecortix Pte. Ltd., Singapore (SG)

(72) Inventors: Nikolay Nez, Tokyo (JP); Antonio Tomas Nevado Vilchez, Tokyo (JP); Hamid Reza Zohouri, Sunnyvale, CA (US); Mikhail Volkov, Tokyo (JP); Oleg Khavin, Tokyo (JP); Sakyasingha Dasgupta, Tokyo (JP)

(73) Assignee: EDGECORTIX PTE. LTD., Singapore (SG)

( * ) Notice: Subject to any disclaimer, the term of this patent is extended or adjusted under 35 U.S.C. 154(b) by 0 days.

(21) Appl. No.: 17/186,003

(22) Filed: Feb. 26, 2021

(30) Foreign Application Priority Data

May 15, 2020 (JP) .............................. JP2020-086356

(51) Int. Cl.
*G06N 3/063* (2006.01)
*G06N 3/10* (2006.01)
*G06N 3/04* (2006.01)

(52) U.S. Cl.
CPC .............. *G06N 3/063* (2013.01); *G06N 3/04* (2013.01); *G06N 3/10* (2013.01)

(58) Field of Classification Search
None
See application file for complete search history.

(56) References Cited

U.S. PATENT DOCUMENTS

| 9,747,546 | B2 | 8/2017 | Ross et al. |
| 10,019,668 | B1 * | 7/2018 | Woo ........................ G06N 3/08 |
| 10,733,350 | B1 * | 8/2020 | Prasad .................. G06F 30/392 |
| 10,846,201 | B1 * | 11/2020 | Diamant ................ G06N 3/063 |

(Continued)

FOREIGN PATENT DOCUMENTS

| JP | 2017102790 A | 6/2017 |
| JP | 2018538607 A | 12/2018 |
| JP | 2020521195 A | 7/2020 |

OTHER PUBLICATIONS

Xiao et al . "Tux 2 : Distributed Graph Computation for Machine Learning ," Proceedings of the 14th USENIX Symposium on Networked System Design and Implementation , Mar. 27, 2017 , pp. 669-682. (Year: 2017).*

Zlateski, A., et al. (May 2016). "ZNN—A Fast and Scalable Algorithm for Training 3D Convolutional Networks on Multi-core and Many-Core Shared Memory Machines". In 2016 IEEE International Parallel and Distributed Processing Symposium (IPDPS) (pp. 801-811). IEEE. (Year: 2016).*

(Continued)

*Primary Examiner* — Kamran Afshar
*Assistant Examiner* — Benjamin J Buss
(74) *Attorney, Agent, or Firm* — Hauptman Ham, LLP

(57) ABSTRACT

Neural network accelerator hardware-specific division of inference may be performed by operations including obtaining a computational graph and a hardware chip configuration. The operations also include dividing inference of the plurality of layers into a plurality of groups. Each group includes a number of sequential layers based on an estimate of duration and energy consumption by the hardware chip to perform inference of the neural network by performing the mathematical operations on activation data, sequentially by layer, of corresponding portions of layers of each group. The operations further include generating instructions for the hardware chip to perform inference of the neural network, sequentially by group, of the plurality of groups.

18 Claims, 12 Drawing Sheets

(56) References Cited

U.S. PATENT DOCUMENTS

| | | | | |
|---|---|---|---|---|
| 2009/0076993 | A1* | 3/2009 | Ananthanarayanan | G06N 3/049 706/44 |
| 2016/0364644 | A1* | 12/2016 | Brothers | G06N 3/049 |
| 2017/0124452 | A1 | 5/2017 | Tucker et al. | |
| 2017/0160783 | A1 | 6/2017 | Kawabe | |
| 2018/0032796 | A1* | 2/2018 | Kuharenko | G06F 16/5838 |
| 2018/0137406 | A1* | 5/2018 | Howard | G06N 3/04 |
| 2018/0373976 | A1 | 12/2018 | Woo | |
| 2019/0311251 | A1* | 10/2019 | Chen | G06N 3/06 |
| 2019/0340490 | A1* | 11/2019 | Fishel | G06N 3/08 |
| 2019/0370643 | A1* | 12/2019 | Aflalo | G06N 3/08 |
| 2020/0004514 | A1* | 1/2020 | Yu | G06F 8/451 |
| 2020/0143251 | A1* | 5/2020 | Cho | G06N 3/063 |
| 2020/0293879 | A1* | 9/2020 | Rubin | G06N 3/084 |
| 2021/0073169 | A1* | 3/2021 | Wang | G06F 9/5066 |
| 2021/0089865 | A1* | 3/2021 | Wang | G06N 3/0635 |
| 2021/0089874 | A1* | 3/2021 | Shan | G06F 1/32 |
| 2021/0158041 | A1* | 5/2021 | Chowdhary | G05D 1/0246 |
| 2021/0182682 | A1* | 6/2021 | Meng | G06N 3/082 |

OTHER PUBLICATIONS

Dogan, H. et al. (May 2017). "Accelerating graph and machine learning workloads using a shared memory multicore architecture with auxiliary support for in-hardware explicit messaging". In 2017 IEEE International Parallel and Distributed Processing Symposium (IPDPS) (pp. 254-264). IEEE. (Year: 2017).*

Mark Sandler et al., MobileNetV2: "Inverted Residuals and Linear Bottlenecks",The IEEE Conference on Computer Vision and Pattern Recognition (CVPR), 2018, pp. 4510-4520. 14pp.

Vivienne Sze et al. "Efficient Processing of Deep Neural Networks: A Tutorial and Survey", pp. 2295-2329, vol. 105, No. 12, Dec. 2017, Proceedings of the IEEE. 35pp.

Thierry Moreau et al. VTA: An Open Hardware-Software Stack for Deep Learning., Jul. 11, 2018, [https://arxiv.org/abs/1807.04188v1]19pp.

Notice of Allowance in JP Application No. 2020-086356, dated Jan. 5, 2021, 6pp.

Office Action in JP Application No. 2020-086356, dated Nov. 10, 2020, 11pp.

* cited by examiner

NEURAL NETWORK ACCELERATOR HARDWARE-SPECIFIC DIVISION OF INFERENCE INTO GROUPS OF LAYERS

RELATED APPLICATIONS

The present application claims priority to Japanese Patent Application No. 2020-086356 filed May 15, 2020, the disclosure of which is hereby incorporated by reference herein in its entirety.

BACKGROUND

Technical Field

The present invention relates to neural network accelerator hardware-specific division of neural network inference. More specifically, the present invention relates to division of a neural network into groups of layers and/or division of each layer into portions based on estimates of duration and energy consumption.

Background

Real-time neural network (NN) inference is going to be ubiquitous for computer vision or speech tasks on edge devices for applications such as autonomous vehicles, robotics, smartphones, portable healthcare devices, surveillance, etc. Specialized NN inference hardware, such as Google TPU, has become a mainstream way of providing power efficient inference. Google TPU's efficiency is restricted mainly to point-wise convolution and dense fully connected layer types of a deep neural network (DNN).

On the other hand, MobileNet-like DNN architectures greatly reduce the number of Multiply and Accumulate (MAC) computations to be performed while achieving high accuracy, resulting in lower total latency and energy spent on MAC operations. However, accelerating the inference of such DNNs on hardware requires support for Inverted Residual Bottleneck type DNN Layers or similarly constructed combination of point-wise and depth-wise convolution DNN layers. Providing efficient inference system with support for such MobileNet-like architectures will enable a new generation of energy efficient hardware-software systems for edge computing applications.

SUMMARY

According to an aspect of the present invention, provided is a computer program including instructions that are executable by a computer to cause the computer to perform operations for hardware-specific division of inference. The operations include obtaining a computational graph and a hardware chip configuration. The computational graph of a neural network has a plurality of layers. Each layer has a plurality of nodes and a plurality of edges. Each node includes a representation of a mathematical operation. The hardware chip configuration includes at least one module for performing the mathematical operations and an on-chip memory. The hardware chip is operable to perform inference of the neural network in portions of each layer by performing the mathematical operations on activation data, sequentially by layer, of corresponding portions of layers while interfacing with an external memory storing the activation data. The operations also include dividing inference of the plurality of layers into a plurality of groups. Each group includes a number of sequential layers based on an estimate of duration and energy consumption by the hardware chip to perform inference of the neural network by performing the mathematical operations, sequentially by layer, of corresponding portions of layers of each group. The operations further include generating instructions for the hardware chip to perform inference of the neural network, sequentially by group, of the plurality of groups.

This aspect may also include the method performed by the processor executing the instructions of the computer program, and an apparatus that performs the method. The apparatus may include an obtaining section configured to obtain a computational graph and a hardware chip configuration, a dividing section configured to divide inference of the plurality of layers into a plurality of groups, and a generating section configured to generate instructions for the hardware chip to perform inference of the convolutional neural network, sequentially by group, of the plurality of groups.

According to an aspect of the present invention, provided is an apparatus including an activation memory, a data loading module configured to load activation data from an external memory onto the activation memory, and a data storing module configured to store activation data from the activation memory onto the external memory. The apparatus also includes a weight memory, and a weight loading module configured to load weight values from an external memory onto the activation memory. The apparatus further includes an accumulation memory, a plurality of convolution modules configured to perform mathematical operations on the activation data stored in the activation data memory and the weight values stored in the weight memory, and to store values resulting from the mathematical operations onto the accumulation memory, and a plurality of activation modules configured to perform activation operations on the values stored in the accumulation memory, and to store resulting activation data onto the activation data memory. The apparatus also includes an instruction module configured to feed and synchronize instructions from the external memory to the data loading module, the data storing module, the weight loading module, the plurality of convolution modules, and the plurality of activation modules, to perform inference of a convolutional neural network.

The summary clause does not necessarily describe all necessary features of the embodiments of the present invention. The present invention may also be a sub-combination of the features described above.

DESCRIPTION OF EXEMPLARY EMBODIMENTS

Hereinafter, example embodiments of the present invention will be described. The example embodiments shall not limit the invention according to the claims, and the combinations of the features described in the embodiments are not necessarily essential to the invention.

The inventors herein have found that a significant part of the total energy consumed during performance of inference is dissipated in external memory access, with more external memory throughput requiring more energy consumption.

Embodiments of the present invention may seek to minimize the number of external memory accesses, and generally provide high computation density in terms of teraoperations per second per unit of area (TOP/s/Area) and resource utilization. Exemplary embodiments may generate instructions to perform inference by a hardware system, such as an ASIC or an FPGA, capable of performing efficient neural network inference by grouping neural network layers and avoiding external memory accesses between processing them to reduce the total number of external memory accesses as compared to processing the layers one by one and storing all intermediate data in the external memory. This may allow flexibility in handling various neural networks with performance and power efficiency close to a fixed-neural-network chip, and flexibility to handle a variety of neural networks, such as convolutional neural networks, including MobileNet variations.

Techniques herein may be beneficial in conditions when an entire input layer cannot fit into an on-chip memory. By modifying various degrees of parallelism in the system, a hardware chip could be tuned for a particular set or "family" of neural networks and a set of resource constraints, such as area and power, such as by using an automated design-search process. The hardware can be scaled from power-restricted edge devices to data centers by adjusting scaling parameters. By reducing external memory accesses, stochasticity in performance may be reduced as well.

Figure 1:
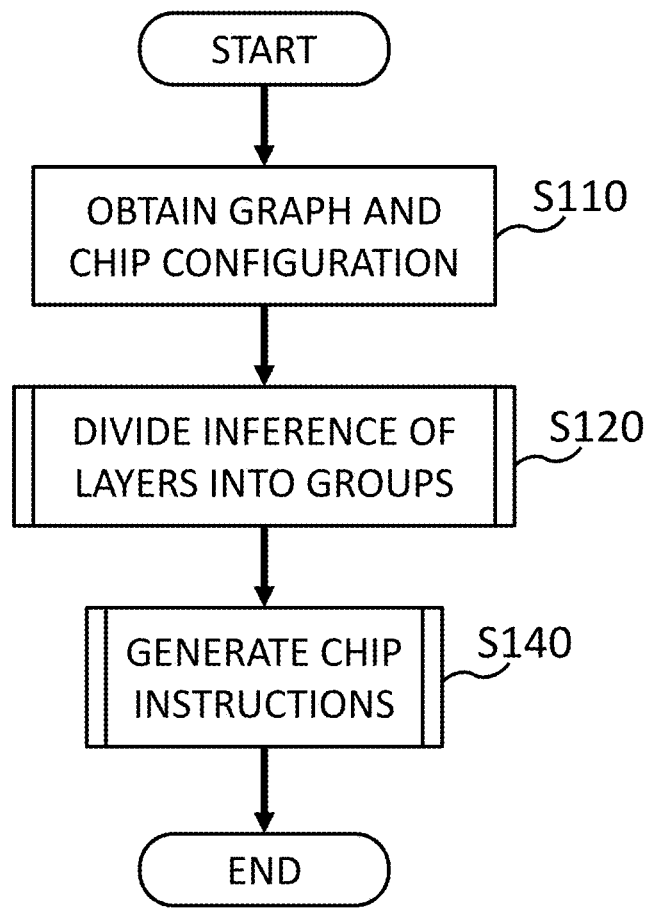
FIG. 1 shows an operational flow for hardware-specific division of inference, according to an embodiment of the present invention.

FIG. 1 shows an operational flow for neural network accelerator hardware-specific division of inference, according to an embodiment of the present invention. The operational flow may provide a method of dividing inference for performance on a specific hardware chip configuration.

At S110, an obtaining section obtains a computational graph and a hardware chip configuration. The computational graph is of a neural network having a plurality of layers, each layer having a plurality of nodes and a plurality of edges, and each node including a representation of a mathematical operation. The hardware chip configuration includes at least one module for performing the mathematical operations and an on-chip memory. The hardware chip is operable to perform inference of the neural network in portions of each layer by performing the mathematical operations on activation data, sequentially by layer, of corresponding portions of layers while interfacing with an external memory storing the activation data.

At S120, a dividing section divides inference of the plurality of layers into a plurality of groups. Each group includes a number of sequential layers based on an estimate of duration and energy consumption by the hardware chip to perform inference of the neural network by performing the mathematical operations, sequentially by layer, of corresponding portions of layers of each group.

At S140, a generating section generates instructions for the hardware chip to perform inference of the neural network, sequentially by group, of the plurality of groups.

Figure 2:
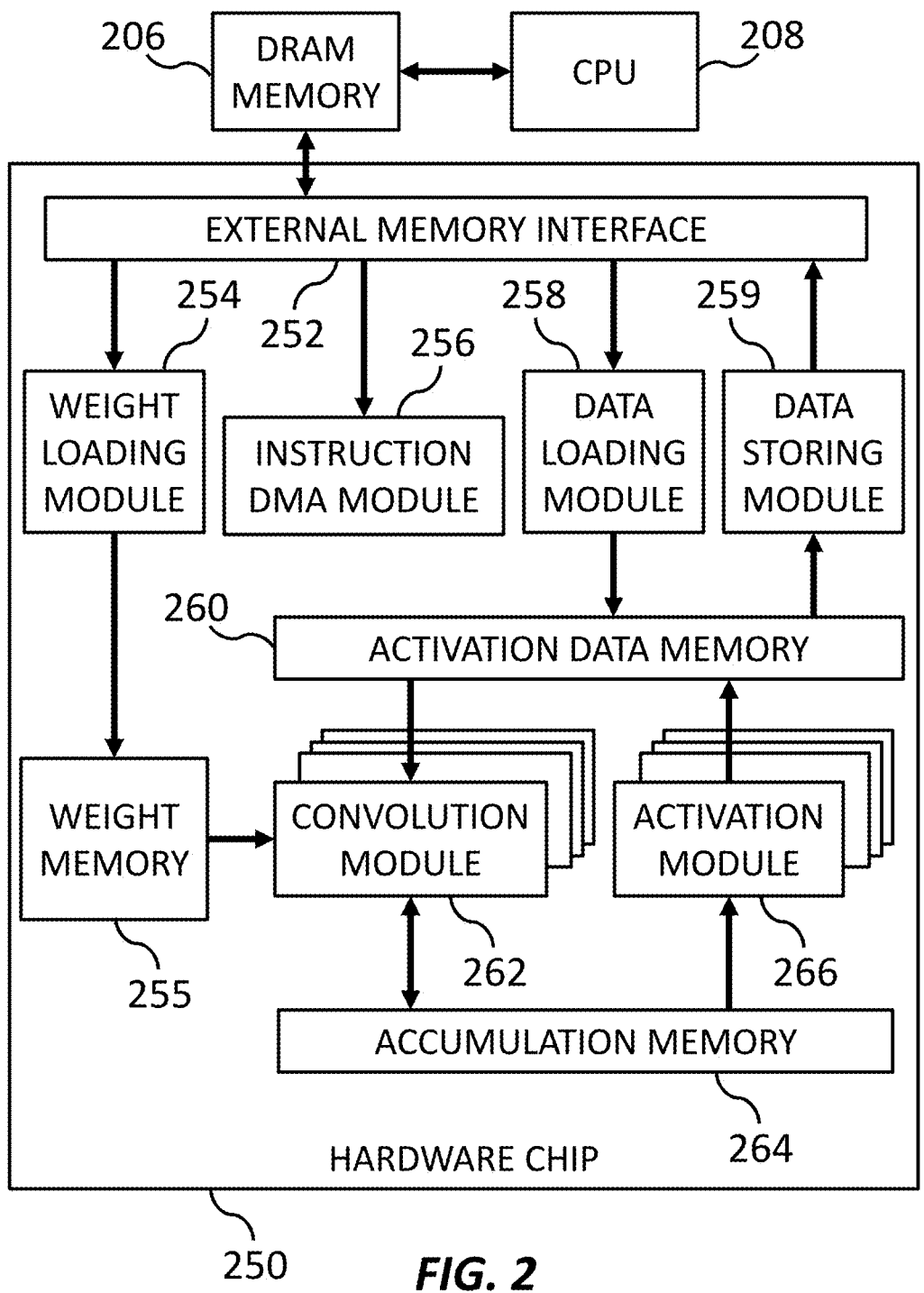
FIG. 2 shows an exemplary configuration of a hardware chip operable to perform neural network inference, according to an embodiment of the present invention.

FIG. 2 shows an exemplary configuration of a hardware chip 250 operable to perform neural network inference, according to an embodiment of the present invention. Hardware chip 250 may be referred to as a neural network accelerator. In this embodiment, hardware chip 250 is an Application Specific Integrated Circuit (ASIC). The modules of hardware chip 250 may be groups of logic gates arranged to perform specific functions. The memories of hardware chip 250 may be RAM, flash memory, or other embedded writable memory.

The hardware chip configuration includes at least one module for performing the mathematical operations and an on-chip memory. In this embodiment, hardware chip 250 includes an external memory interface 252. The at least one module of the hardware chip 250 includes at least one convolution module 262, at least one module for performing activation operations, an activation module 266, at least one module for loading the activation data from the external memory onto the on-chip memory, a data loading module 258, at least one module for storing activation data on the external memory from the on-chip memory, a data storing module 259, at least one module for loading weights of the convolution neural network from the external memory to the on-chip memory, a weight loading module 254, and at least one module for loading instructions of these modules from the external memory, an instruction DMA module 256. The on-chip memory includes a weight memory 255, an activation data memory 260, and an accumulation memory 264.

External memory interface 252 is configured to allow hardware chip 250, and the various modules therein, to exchange data with a DRAM memory 206, the external memory. A Central Processing Unit (CPU) 208 may request neural network inference for use in an application.

Weight loading module 254 and data loading module 258 are configured to read and load data from an external memory, such as DRAM memory 206, through external memory interface 252. Weight loading module 254 may sequentially read weight values from the external memory and load such data onto weight memory 255.

Data loading module 258 may read input values, activation data, etc., from the external memory and load such data onto activation data memory 260. Data storing module 259 is configured to store activation data onto the external memory through external memory interface 252. Data storing module 259 may read activation data from activation data memory 260 and store such data onto DRAM memory 206. Data loading module 258 and data storing module 259 may operate on portions, such as rectangular subregions, blocks, or tiles, of activation data stored in the external memory. Data loading module 258 and data storing module 259 may also be used for a type of operation known as a "spill-fill", in which intermediate computation results are temporarily "evacuated" to the external memory when the capacity of an on-chip memory is insufficient.

Weight memory 255, activation memory 260, and accumulation memory 264 are all blocks of the on-chip memory of hardware chip 250. The hardware chip configuration specifies a number and size of the banks of each block of the on-chip memory. Each block may be organized as a set of one or two port memory banks. Each block may have read and write ports exposed to corresponding computation modules, load modules, and store modules. Hardware chip 250 may further include arbitration & interconnect logic connecting the on-chip memory to I/O ports, such as external memory interface 252. Loading and storing modules of hardware chip 250 may be configured to acquire locks to a memory bank of the on-chip memory, perform a set of read or write transactions, and then release the memory bank when no longer in use. In this manner, two or more modules may access different memory banks in parallel.

In this exemplary embodiment, hardware chip 250 is configured to perform inference of a convolutional neural network, and so the portions of each layer are tiles, and hardware chip 250 includes convolution modules 262. In other words, the at least one module of the hardware chip 250 includes at least one convolution module.

Convolution modules 262 are configured to perform mathematical operations on the input values or activation data stored in activation data memory 260 and the weight values stored in weight memory 255. Convolution modules 262 may output partial sums to accumulation memory 264, and may also perform accumulation with existing partial sums stored in accumulation memory 264. Convolution modules 262 may provide direct support for different parameters of mathematical operations, such as a kernel size of height (KH)×width (KW), vertical and horizontal strides, dilation, padding, etc. In some embodiments of the hardware chip 250, convolution modules 262 include at least one dedicated depth-wise convolution module and at least one point-wise convolution module. In other embodiments of the hardware chip 250, convolution modules 262 include generic convolution modules, which may support combinations of depth-wise convolution and point-wise convolution layers, such as Inverted Residual Blocks in MobileNet architectures.

Activation modules 266 are configured to perform activation operations on values stored in accumulation memory 264. Activation modules 266 may read input values from accumulation memory 264 and store computation results in activation data memory 260. Activation modules 266 may perform computations such as elementwise math functions, including addition, multiplication, division, square root, etc. of scalar or vector values following the mathematical operations of convolution modules 262 in order to provide activation functions, such as ReLU, LeakyReLU, Hsigmoid, H-Swish, etc. Activation modules 266 may further perform residual addition of branches, requantization, local pooling such as max-pooling and average pooling with a set of fixed window sizes.

Parameters of the operations performed by hardware chip 250, and the various modules therein, may be stored in a separate memory, such as weight memory 255, a dedicated memory, or embedded into the instructions as immediate values. Instruction DMA module 256 is configured to load instructions of the various modules of hardware chip 250. Instruction DMA module 256 may load instructions of the various modules of hardware chip 250 in round-robin fashion from the external memory. The instruction infrastructure of hardware chip 250 may feed and synchronize instructions. The instruction infrastructure of hardware chip 250 may include, in addition to instruction DMA module 256, at least one instruction queue, such as First-In-First-Out (FIFO) memories, for carrying encoded instructions to each of the various modules, which explicitly controls the behavior of the modules.

Although in this embodiment the hardware chip is configured to perform inference of a convolutional neural network, other embodiments may perform hardware-specific division of inference of other kinds of neural networks. In addition to the data loading module and the data storing module attached to the activation data memory, other embodiments of the hardware chip may include an additional pair of loading and storing modules that may be attached to the accumulation memory. In other embodiments, the weight loading module may also be used for loading activation module parameters.

Figure 3:
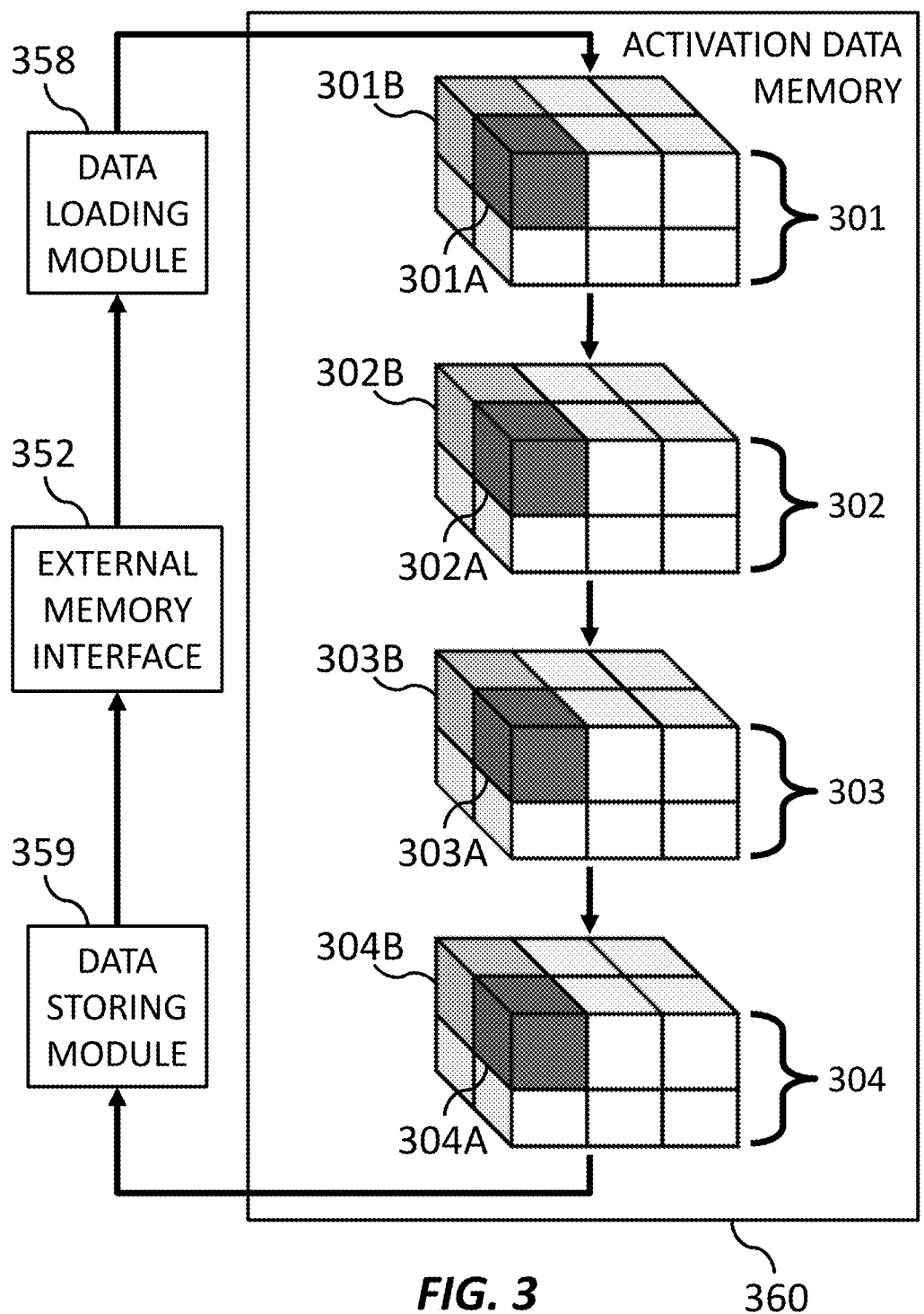
FIG. 3 shows a diagram of a performance of inference of the neural network in portions of each layer, according to an embodiment of the present invention.

FIG. 3 shows a diagram of a performance of inference of the neural network in portions of each layer, according to an embodiment of the present invention. In this embodiment, a convolutional neural network has been divided into groups of layers based on some heuristic including an estimate of duration and energy consumption. Each layer is apportioned into tiles of 3 dimensions: height, width, and channels. The sizes of the dimensions are established such that the tiles of a layer may be processed using a subset of tiles from a previous layer. For point-wise convolution, all tiles in the channel dimension are required for processing the activation data thereof. For depth-wise convolution, one tile is sufficient to process the activation data of the corresponding tile in a subsequent layer.

The neural network includes example sequential layers 301, 302, 303, and 304 among other layers. During the performance of inference in this embodiment, a data loading module 358 reads input values or activation data from an external memory through external memory interface 352, and loads such data onto an activation data memory 360. A data storing module 359 reads activation data from activation data memory 360, and stores such data onto the external memory through external memory interface 352. In other words, the generating instructions for the hardware chip further includes generating instructions for the hardware chip to retrieve activation data of corresponding portions in the first layer in each group from the external memory, and record activation data resulting from the mathematical operations of corresponding portions in the last layer in each group to an external memory.

In this embodiment, layers 301, 302, 303, and 304 belong to a single group, which means that activation data is loaded from the external memory only once and stored on the external memory only once during the performance of inference of corresponding portions of layers 301, 302, 303, and 304. Enough input tiles must be loaded to process the activation values of tile 301A in the height and width dimension of layer 301 into on-chip memory. Because of data dependencies of convolution operations other than 1×1, tiles of subsequent layers will shrink in area. Thus, all but the tile of the last layer usually overlap by $(K-1)/2$ for a K×K (equal height and width) convolution kernel, which may increase the amount of computations. Thus, the computational graph of the neural network is divided into groups of layers to balance the amount of additional computations with the number of memory transactions required to store a whole intermediate layer into external memory.

Since activation data of both tiles 301A and 301B are required to process the activation data of tile 302A, activation data of tiles 301A and 301B of layer 301 are loaded onto activation data memory 360. The activation data of tiles 301A and 301B are processed to yield activation data of tiles 302A and 302B of layer 302, which are also stored onto activation data memory 360. This allows processing of the next layer of activation data of tiles based on activation data of the previous layer already loaded onto activation data memory 360, with the resulting activation data stored in the activation data memory as well.

Once the activation data of tiles 302A and 302B are loaded onto activation data memory 360, the activation data of tiles 301A and 301B may be cleared to free space on activation data memory 360 for the next activation data. The processing and yielding is repeated for each layer moving deeper in the group. Next, the activation data of tiles 302A and 302B are processed to yield activation data of tiles 303A and 303B of layer 303, which are loaded onto activation data memory 360. The activation data of tiles 303A and 303B are then processed to yield activation data of tiles 304A and 304B of layer 304, which are loaded onto activation data memory 360. Finally, data storing module 359 stores the activation data of tiles 304A and 304B onto the external memory through external memory interface 352.

In this embodiment, the performance of inference was divided into portions, or tiles, as well as groups; other embodiments may not require apportioning each layer, such as when the activation data memory is large enough to load activation data for an entire layer.

Figure 4:
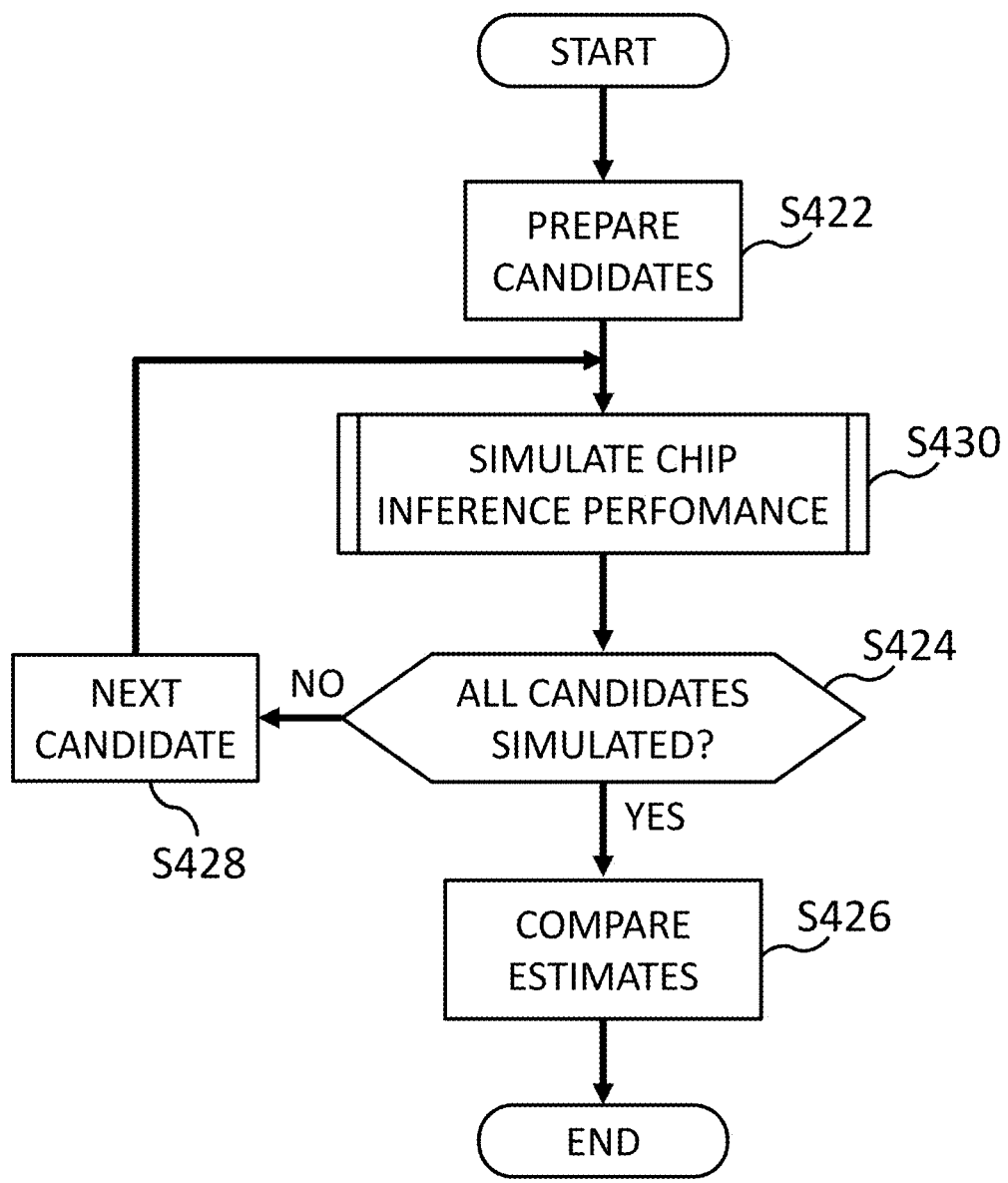
FIG. 4 shows an operational flow for dividing inference of layers into groups, according to an embodiment of the present invention.

FIG. 4 shows an operational flow for dividing inference of layers into groups, such as S120 of FIG. 1, according to an embodiment of the present invention. The operations within this operational flow may be performed by a dividing section or a correspondingly named sub-section thereof. As described in FIG. 1, the computational graph and the hardware chip configuration are obtained prior to dividing inference of layers into groups.

At S422, a preparing section, such as the dividing section or a sub-section thereof, prepares a plurality of candidate group divisions, each candidate group division identifying a unique division of the plurality of layers. A candidate group division specifies a group to which each layer belongs, provided that each group must have consecutive layers. For example, each of the plurality of candidate group divisions may identify even divisions of the plurality of layers. As another example, each of the plurality of candidate group divisions may identify random divisions of the plurality of layers in groups of single layers, two layers, three layers, etc. A candidate group division may also include only some of the layers of the neural network, so that finer divisions can be analyzed.

At S430, a simulating section simulates a performance of inference of the neural network by the hardware chip to determine the estimate of duration and energy consumption of the hardware chip for one of the candidate group divisions. As iterations proceed, the simulating section simulates performance of inference of the neural network by the hardware chip to determine the estimate of duration and energy consumption of the hardware chip for each of the plurality of candidate group divisions.

At S424, the dividing section or a sub-section thereof determines whether all of the candidate group divisions have been simulated. If unsimulated candidates remain, then the operational flow proceeds to S428, where a new candidate group division is selected for simulation. If all candidate group divisions have been simulated, then operational flow proceeds to S426.

At S426, a comparing section, such as the dividing section or a sub-section thereof, compares the estimate of duration and energy consumption of each candidate group division of the same layers among the plurality of layers. Although partial candidate group divisions may be included, to make a fair comparison, the estimates must cover an inference performance of the same layers. For example, the plurality of candidate group divisions may identify a single layer as a first candidate group division, a preceding group of layers as a second group division, and the single layer together with the preceding group of layers as a third candidate group division. In such an example, a fair comparison may include comparing (i) an estimate of duration and energy consumption to perform the mathematical operations of the third candidate group division and (ii) an estimate of total duration and total energy consumption to perform the mathematical operations of the first candidate group division and the second candidate group division. This example may be useful for a particular embodiment of dividing inference of the layers into groups, in which a heuristic algorithm uses layer-aware grouping. The algorithm starts with an empty group, and then a first ungrouped layer is added to the group. The simulating section then estimates duration and energy consumption of inference of the group, inference of next ungrouped layer, and inference of the group with next ungrouped layer added. If inference of the group with next ungrouped layer added outperforms the sum of inference of the group and inference of next ungrouped layer, then the process is repeated for the next layer. However, if inference of the group with the next ungrouped layer added does not outperform the sum of inference of the group and inference of next ungrouped layer, then the group will not include the next ungrouped layer, and the process will proceed to consider a group of only the next ungrouped layer. This process is repeated for all of the layers of the network.

While this embodiment simulates performance of inference of the neural network by the hardware chip, other embodiments may execute inference of the neural network directly on the hardware chip. While such embodiments may not need a simulation environment, measuring duration and energy consumption for all the different candidates may be more time consuming than in the simulation environment.

Figure 5:
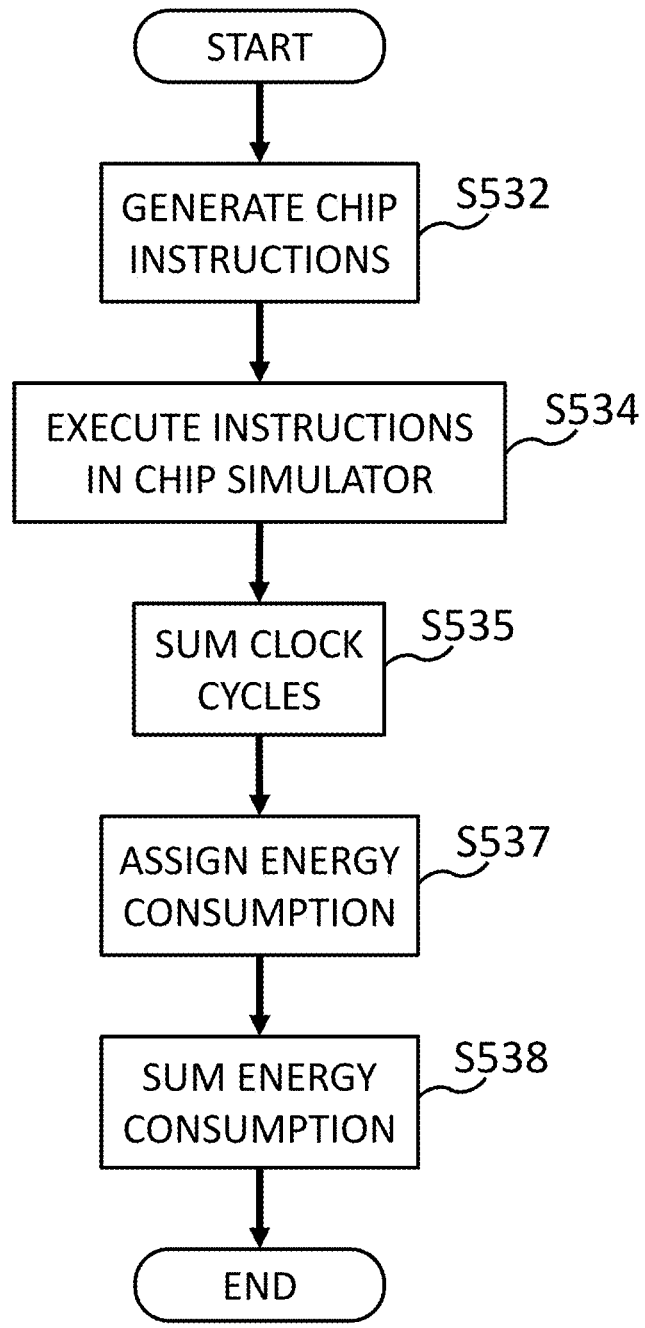
FIG. 5 shows an operational flow for simulating performance of inference on a hardware chip, according to an embodiment of the present invention.

FIG. 5 shows an operational flow for simulating performance of inference on a hardware chip, such as S430 of FIG. 4, according to an embodiment of the present invention. The operations within this operational flow may be performed by a simulating section or a correspondingly named sub-section thereof. As described in FIG. 4, candidate group divisions are prepared prior to simulating performance of inference.

At S532, a generating section generates instructions for the hardware chip to perform inference according to the candidate group division. In other words, the generating section generates instructions for the hardware chip to perform the mathematical operations, sequentially by layer, of corresponding portions in layers of each group. Although just for simulation, the instructions may be generated in the same manner as for the actual hardware chip, such as S140 of FIG. 1. More details of the instruction generation operation are described with respect to FIG. 7.

At S534, an executing section, such as the simulating section or a sub-section thereof, executes the instructions on a simulation of the hardware chip. This may include tracking, recording, or otherwise identifying the operations in each clock cycle. The operations that are identified are the simple, fine-grained operations that are performed by individual modules, many times in parallel with operations of other modules.

At S535, a summing section, such as the simulating section or a sub-section thereof, sums the clock cycles during the simulation. Although the simulation may run magnitudes faster than inference on the actual hardware chip, the amount of time of a clock cycle of the hardware chip can be determined based on the configuration of the hardware chip. For example, if the hardware chip configuration runs at 2 GHz, then it can be estimated that two billion clock cycles will last one second of time.

At S537, an assigning section, such as the simulating section or a sub-section thereof, assigns an energy consumption to each fine-grained operation of the simulation. Although performance of inference may include complex processes, those processes are broken down into these fine-grained operations, each of which can be associated with an energy consumption measured from this simulation or a previous simulation of the same fine-grained operation on the same hardware chip. In some embodiments, energy consumptions associated with each fine-grained operation of the hardware chip may be supplied from an input file independent of the simulation environment.

At S538, the summing section sums the energy consumption of all of the fine-grained operations of the simulation. In other words, the estimate of energy consumption of the hardware chip is based on a sum of individual energy consumptions associated with each operation, and the estimate of duration is based on the number of clock cycles.

Figure 6:
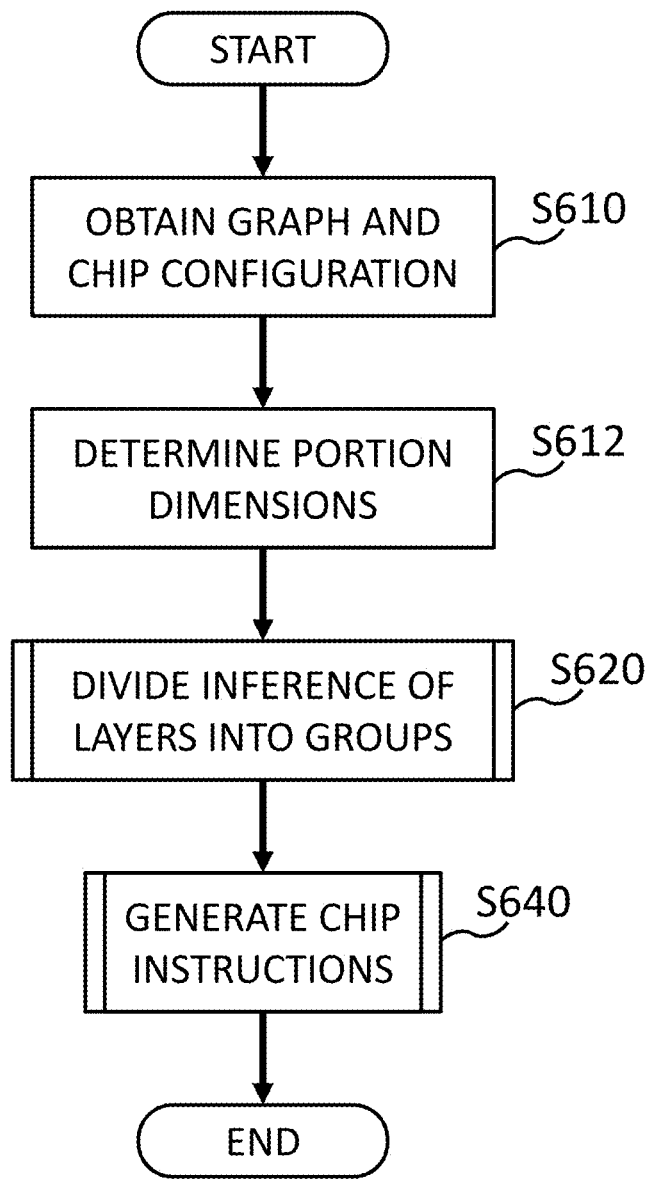
FIG. 6 shows an operational flow for hardware specific division of inference, according to another embodiment of the present invention.

FIG. 6 shows an operational flow for hardware specific division of inference, according to another embodiment of the present invention. The operational flow may provide a method of dividing inference for performance on a specific hardware chip configuration.

The operations performed at S610, S620, and S640 are substantially similar to the operations performed at S110, S120, and S140, described above with respect to FIG. 1. As explained above, the hardware chip is operable to perform inference of the neural network in portions of each layer. In some embodiments, the dimensions of the portions, or tiles in the case of a convolutional neural network, are predetermined. However, in this embodiment, the operational flow for hardware specific division of inference includes an operation of determining the dimensions of the portions.

At S612, a determining section, such as the dividing section or a sub-section thereof, determines dimensions of the portions of each layer. In some embodiments, the determining section determines the dimensions of the portions of each layer by simulating a performance of inference of the neural network by the hardware chip to determine the estimate of duration and energy consumption of the hardware chip for each of a plurality of candidate dimension specifications. In such embodiments, each candidate dimension specification may be based on a capacity of the on-chip memory and a degree of parallelism of the hardware chip. In some of these embodiments, one of the dimensions of each portion may be defined by the degree of parallelism of the hardware chip, while the other dimensions can be variable. Once all the candidate dimension specifications have been simulated, a comparing section, such as a simulating section or a sub-section thereof, compares the estimate of duration and energy consumption of each candidate dimension specification. One of the candidate dimension specifications may be then be selected for use in the performance of inference. The selection may be based on duration or energy consumption or a balance of both.

While this embodiment simulates performance of inference of the neural network by the hardware chip, other embodiments may execute inference of the neural network directly on the hardware chip. While such embodiments may not need a simulation environment, measuring duration and energy consumption may be more difficult than in the simulation environment.

Figure 7:
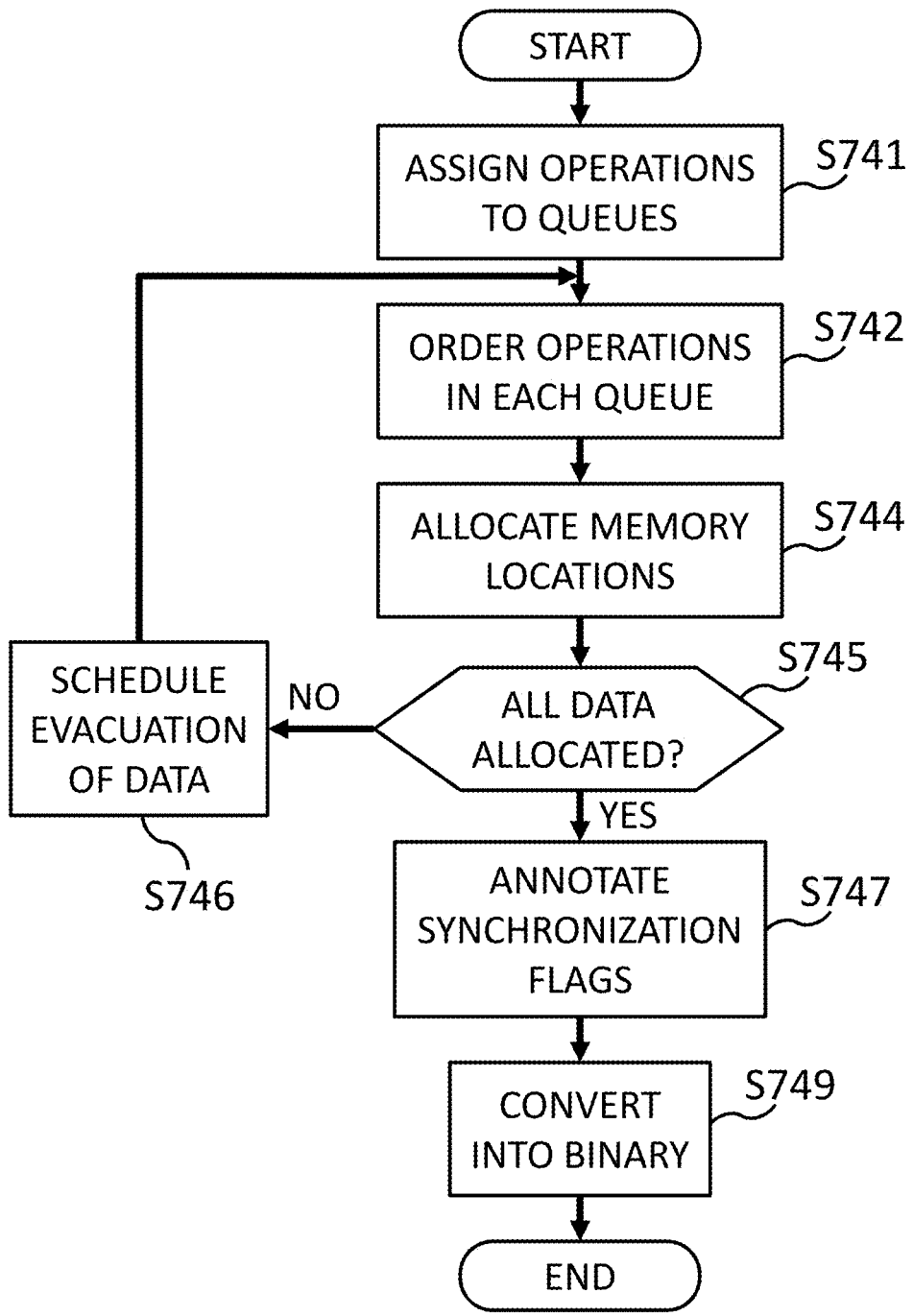
FIG. 7 shows an operational flow for generating instructions for the hardware chip to perform inference, according to another embodiment of the present invention.

FIG. 7 shows an operational flow for generating instructions for the hardware chip to perform inference, such as S140 of FIG. 1, according to an embodiment of the present invention. The operations within this operational flow may be performed by a generating section or a correspondingly named sub-section thereof. As described in FIG. 1, the layers of the neural network have been divided into groups.

At S741, an assigning section, such as the generating section or a sub-section thereof, assigns each operation of each module in the hardware chip to a queue. In other words, the generating instructions for the hardware chip further includes assigning each operation to a queue among a plurality of queues. Beginning from the computational graph, each node represents an instruction from an Instruction Set Architecture (ISA) of the hardware chip, and each edge represents a virtual buffer holding data from one portion of a layer. For purposes of assigning operations to queues, the number of virtual buffers is unlimited. Each virtual buffer is unique and associated with one particular value in the computational graph. However, the same physical buffer may be assigned to multiple edges with non-overlapping lifetimes across the scheduled computational graph. In order to perform the instructions in the computational graph on the hardware chip, there must be a load instruction for each input portion of a group, and there must be a store instruction for each output portion of a group. Similar to the operations identified during simulation of the performance of inference, the operations assigned to each queue are the simple, fine-grain operations that are performed by individual modules, many times in parallel with operations of other modules. Each instruction may be realized by multiple fine-grain operations. A queue may have operations that are performed by more than one module. Every module in the system executes its own linear sequence of instructions, which can be broken down into operations. The performance of inference may be thought of as a set of sequential processes running in parallel.

In other words, the generating instructions for the hardware chip further includes ordering execution of operations in each queue. Each parallel process may read from and/or write to multiple memories. Each instruction in the process may result in operations on many data elements during many clock cycles. Therefore, proper ordering of the operations may be critical to ensuring that operation dependencies are satisfied and each operation is performed at a time when the necessary resources are available. The ordering section may also optimize the order to minimize execution time, and minimize the number of potential evacuations of data.

At S744, an allocating section, such as the generating section or a sub-section thereof, allocates locations in the on-chip memory of the hardware chip for data. In other words, the generating instructions for the hardware chip further includes allocating locations in the on-chip memory to data for performing inference of the neural network. In this embodiment, the generating instructions may also include generating instructions for the at least one module of the hardware chip to perform loading of data from the external memory to the allocated locations. In doing so, the allocating section may replace virtual buffers with physical memory locations of the on-chip memory of the hardware chip for purposes of generating the instructions before execution of inference by the hardware chip.

At S745, the generating section or a sub-section thereof determines whether all of the data that requires allocation can be allocated to available memory. In other words, the generating section determines whether there is enough memory to hold all necessary data for each clock cycle. If there is not enough memory for all necessary data for one or more clock cycles, then the operational flow proceeds to S746, where one or more evacuations of data may be introduced. If there is enough memory for all necessary data for all clock cycles, then the operational flow proceeds to S747.

At S746, an evacuating section, such as the generating section or a sub-section thereof, introduces evacuations of data to the external memory into the operations. Although the dimensions of the portions of each layer are set, as is the division of layers into groups, the performance of inference may encounter times when a particular memory requires more storage space than exists, such as when there are not enough physical memory locations to perform assignment of all edges. In that case, some or all of the data currently stored on the on-chip memory is temporary offloaded onto the external memory, so that the on-chip memory can be cleared for storage of more immediately required data. The cleared data will then later be loaded back onto the on-chip memory when that data once again becomes necessary for further processing. The values to evacuate are selected in an attempt to minimize evacuations of data to the external memory, i.e.—in an attempt to reduce the number of external memory accesses. Once the evacuations are introduced, they must be scheduled into the order of operations, and so the operation flow returns to S742 whenever new evacuations of data are introduced. In other words, the generating instructions for the hardware chip further includes scheduling evacuation of data to the external memory in order to perform inference of the neural network.

At S747, an annotating section, such as the generating section or a sub-section thereof, annotates synchronization flags. In other words, the generating instructions for the hardware chip further includes synchronization flag annotating to preserve mutual ordering of dependent operations. Each consumer-producer pair of processes may have a pair of semaphores/token-queues for Read After Write (RAW) and Write After Read (WAR) dependency synchronization. For any consumer-producer pair of modules to communicate through the same memory, dependencies of each pair of semaphores/token-queues for RAW and WAR may be tracked. Furthermore, each instruction may have set of flags to decrement and increment semaphores corresponding to a particular process. Therefore, in some embodiments, an explicit, compiler-guided token-based synchronization mechanism may be employed to avoid data hazards, while maintaining task-level parallelism.

At S749, a converting section, such as the generating section or a sub-section thereof, converts the instructions into a binary representation. In other words, the generating instructions for the hardware chip further includes converting instructions into binary representation. The binary representation is a format that is suitable to be run on the hardware chip.

Figure 8:
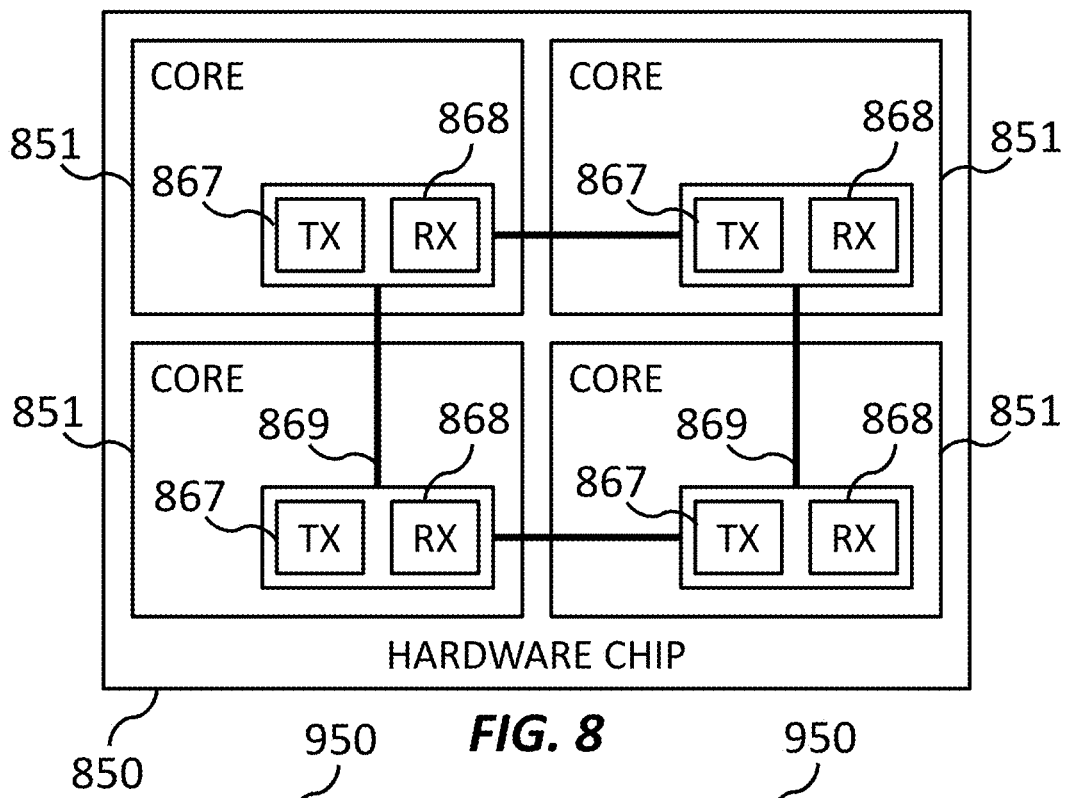
FIG. 8 shows an exemplary configuration of a multi-core hardware chip operable to perform neural network inference, according to an embodiment of the present invention.

FIG. 8 shows an exemplary configuration of a multi-core hardware chip 850 operable to perform neural network inference, according to an embodiment of the present invention. In this embodiment, the hardware chip configuration further includes a plurality of cores 851, and the at least one module for performing the mathematical operations and the on-chip memory are distributed among the plurality of cores. The hardware chip configuration further shows that each core includes at least one transmitter block 867 and at least one receiver block 868 configured for inter-core communication.

Multi-core hardware chip 850 includes four cores 851, each of which is substantially similar to hardware chip 250, described above with respect to FIG. 2, including all the same modules and memories, but with two additional blocks, transmitter block 867, and receiver block 868. The transmitter blocks 867 and receiver blocks 868 of cores 851 are interconnected through one or more write channels 869 allowing write access to memories of other cores, and allowing the loading modules in the core read access to memories of other cores. In some embodiments, data exchange may be facilitated through a circuit-switched arbitrated intra-core interconnect, through which an initiator side must first acquire a lock inside of another core's memory, and then perform "burst" transfer of the data. Other embodiments may include other structures for performing inter-core communication.

Generating instructions for the hardware chip further includes distributing instructions among the cores. By utilizing multi-core hardware chip 850 to perform inference of the neural network, more operations can be performed in parallel, significantly reducing the duration, while requiring little additional energy consumption in the form of data transfers among cores. For example, since multi-core hardware chip 850 includes four cores, it would not be unreasonable to expect the duration of the performance of inference to be reduced by about 75%. Utilizing multi-core hardware chip 850 may allow the performance to be further scaled up to exceed the limits of power density for a single core. When generating instructions for the hardware chip, although additional instructions may be necessary for inter-core data transfer, the generation of instructions for each individual core remains substantially the same as described above.

Figure 9:
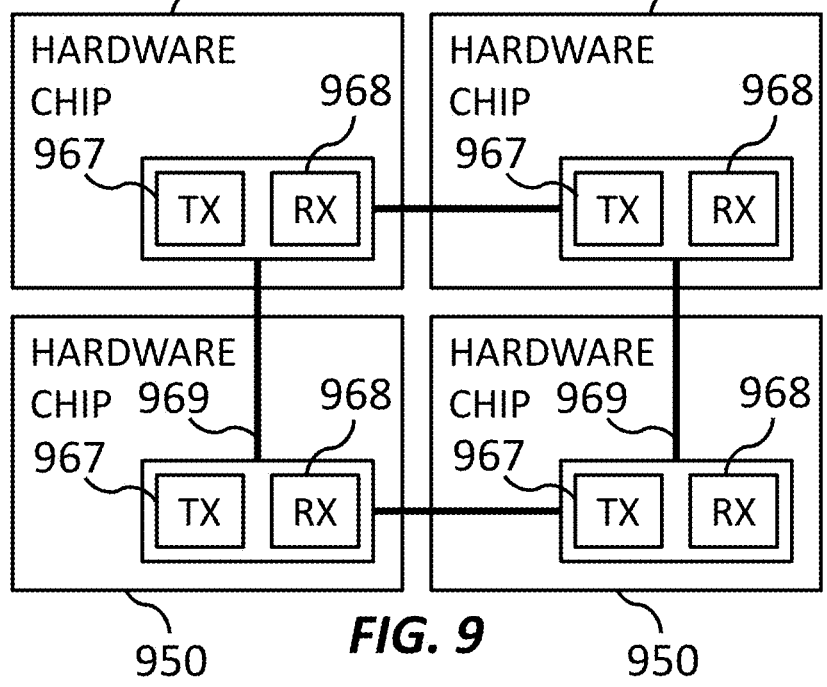
FIG. 9 shows an exemplary configuration of multi-chip hardware operable to perform neural network inference, according to an embodiment of the present invention.

FIG. 9 shows an exemplary configuration of multi-chip hardware operable to perform neural network inference, according to an embodiment of the present invention. In this embodiment, the hardware chip configuration further includes at least one transmitter block 967 and at least one receiver block 968 configured to communicate with a second instance of the hardware chip 950 of a multi-chip hardware configuration.

The multi-chip hardware of this embodiment includes four hardware chips 950, each of which is substantially similar to each core 851, described above with respect to FIG. 8, including all the same modules and memories. Furthermore, the structures and functions of transmitter blocks 967, receiver blocks 968, and write channels 969 are substantially similar to that of transmitter blocks 867, receiver blocks 868, and write channels 869 of FIG. 8. In some embodiments, each hardware chip 950 includes four transmitter blocks and four receiver blocks, which may allow creation of multichip configurations of arbitrary size with hardware chips 950 connected in mesh or 2D Torus topologies. In such embodiments, high speed serial interfaces, such as Serializer/Deserializer (SerDes) interfaces, which are frequently employed in FPGAs and ASICs for creating multi-chip configurations, may be employed for the purpose of implementation of such transmitter and receiver blocks.

In this embodiment, each hardware chip is identical. However, in other embodiments, the hardware chips of a multi-chip hardware configuration may have different components, such as modules for performing different operations, and memories of different sizes. This may be because the chips are used to perform inference of different neural networks. A multi-chip hardware configuration including chips of different configuration may be beneficial for more scalability and when the chips perform inference of multiple neural networks in parallel. In further embodiments, each hardware chip of a multi-chip hardware may be a multi-core hardware chip, such as multi-core hardware chip 850 of FIG. 8.

Figure 10A:
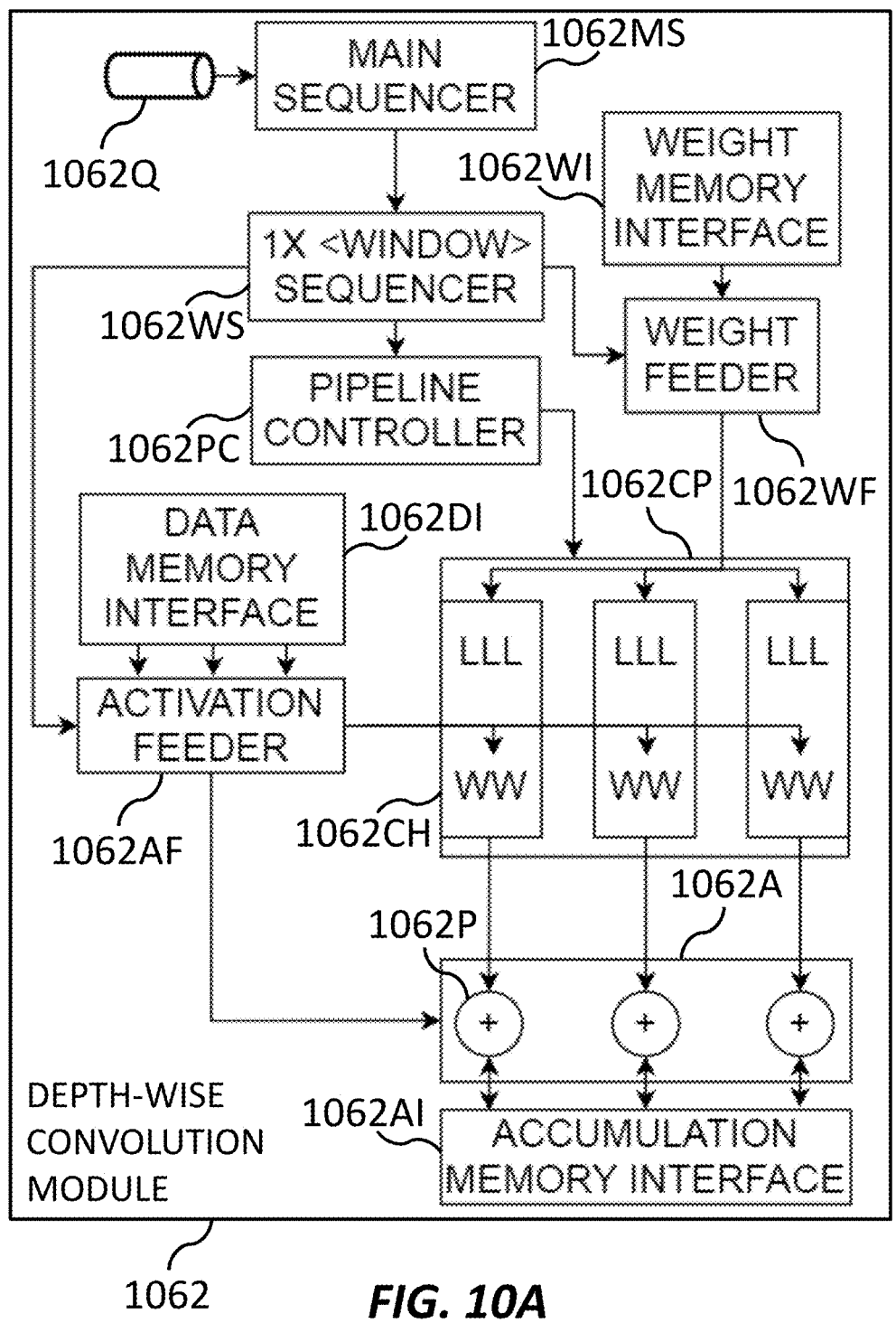
FIG. 10A shows an exemplary configuration of a depth-wise convolution module, according to an embodiment of the present invention.

FIG. 10A shows an exemplary configuration of a depth-wise convolution module 1062, according to an embodiment of the present invention. Depth-wise convolution module 1062 includes a queue 1062Q, a main sequencer 1062MS, a window sequencer 1062WS, an activation feeder 1062AF, a weight feeder 1062WF, a pipeline controller 1062PC, convolution pipelines 1062CP, an external accumulation logic 1062A, and an accumulation memory interface 1062AI.

Queue 1062Q receives and sends instructions. Queue 1062Q may receive instructions from an instruction DMA module, such as instruction DMA module 256 of FIG. 2, and send the instructions to main sequencer 1062MS. Queue 1062Q may be a FIFO memory or any other memory suitable for queueing instructions.

Main sequencer 1062MS sequences control parameters for convolution. Main sequencer 1062MS may receive instructions from queue 1062Q, and output instructions to window sequencer 1062WS. Main sequencer 1062MS splits KH×KW convolution into smaller convolutions of size 1×<window> and prepares instructions for activation data and weight values according to order of input regions within the kernel. Wherein <window> refers to an architecture parameter determining line buffer length.

Window sequencer 1062WS sequences control parameters for one 1×<window> convolution. Window sequencer 1062WS may receive instructions from Main sequencer 1062MS, and output a data sequence of activation data according to order of input regions within the kernel to activation feeder 1062AF and a data sequence of weight values according to order of input regions within the kernel to weight feeder 1062WF.

Activation feeder 1062AF feeds activation data accessed from an activation data memory, such as activation data memory 260 of FIG. 2, through data memory interface 1062DI to convolution pipelines 1062CP in accordance with the activation data indicated in the data sequence from window sequencer 1062S. Activation feeder 1062AF may read activation data sufficient for 1×<window> computation from the activation data memory into a line buffer of the convolution pipelines 1062CP.

Weight feeder 1062WF preloads weight values accessed from a weight memory, such as weight memory 255 of FIG. 2, through weight memory interface 1062WI to convolution pipelines 1062CP in accordance with the weight values indicated in the data sequence from window sequencer 1062S. Weight feeder 1062WF may read weight values sufficient for 1×<window> computation from the weight memory into a weight buffer of the convolution pipelines 1062CP.

Pipeline controller 1062PC controls data transfer operations of convolution pipelines 1062CP. Pipeline controller 1062PC may initiate copying of data from the line buffer into an activation buffer of convolution pipelines 1062CP once the current activation buffer content has been processed. Pipeline controller 1062PC may control convolution computations performed by each channel pipeline 1062CH of convolution pipelines 1062CP, where each channel pipeline 1062CH operates on one channel of the input to the depth-wise convolution layer.

Convolution pipelines 1062CP performs mathematical operations on activation data fed from activation feeder 1062AF and weight values preloaded from weight feeder 1062WF. Convolution pipelines 1062CP is divided into channel pipelines 1062CH, each channel pipeline 1062CH performing mathematical operations for one channel. Combined with activation feeder 1062AF, weight feeder 1062WF, and pipeline controller 1062PC, convolution pipeline logically performs the convolution computations.

External accumulation logic 1062A receives data from convolution pipelines 1062CP, and stores the data in an accumulation memory, such as accumulation memory 264 of FIG. 2, through accumulation memory interface 1062AI. Accumulation logic 1062A includes an adder 1062P for each channel pipeline 1062CH. Accumulation logic 1062A may be used for point-wise summation of results of 1×<window> convolutions with the contents of the accumulation memory.

In this embodiment, there are three channels as exemplified by the three window pipelines. However, other embodiments may have a different number of channels. Although possible, this embodiment shows three channels mainly for simplicity. Many embodiments will include at least 16 channels to accommodate practical applications.

Figure 10B:
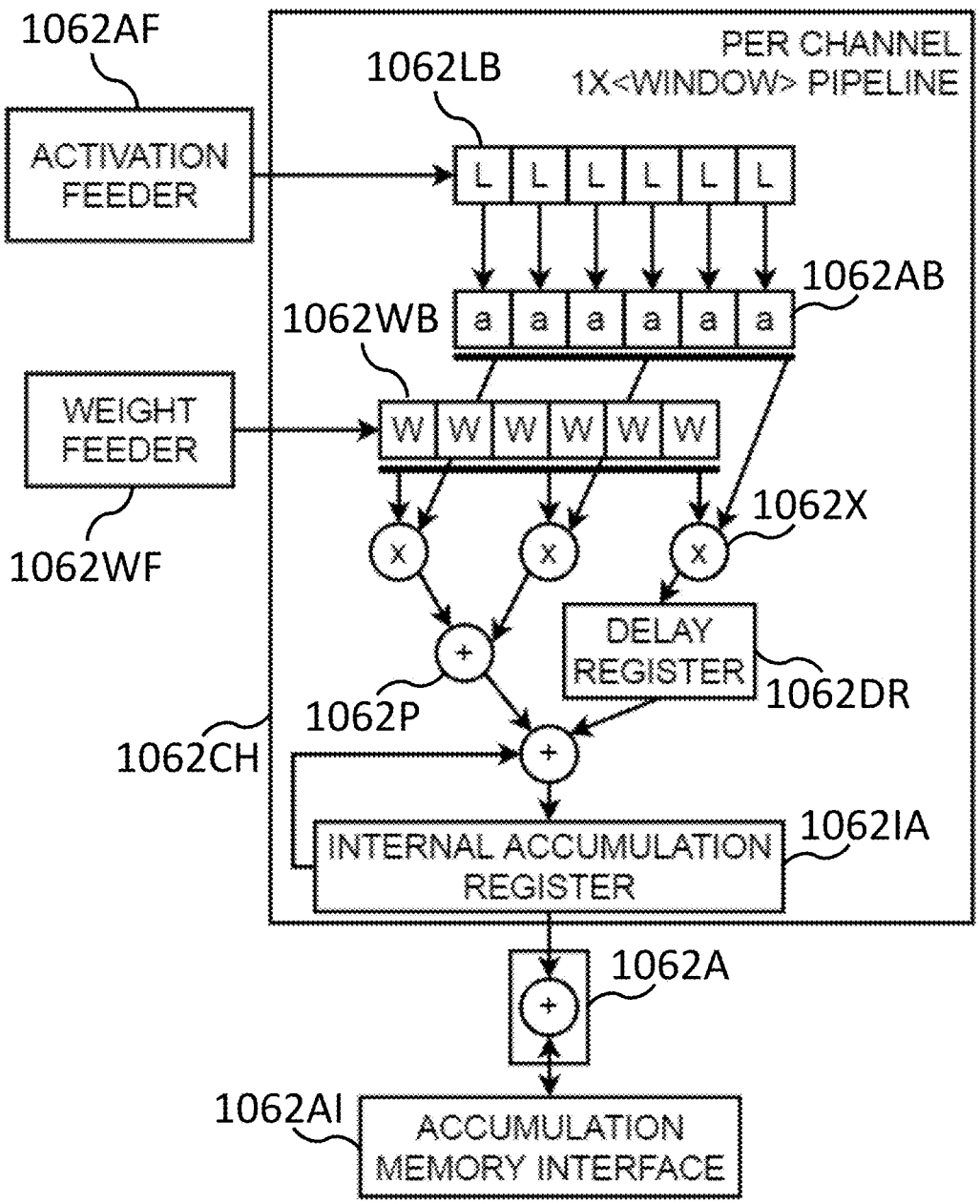
FIG. 10B shows an exemplary configuration of a per-channel pipeline for a depth-wise convolution module, according to an embodiment of the present invention.

FIG. 10B shows an exemplary configuration of a channel pipeline 1062CH for a depth-wise convolution module, according to an embodiment of the present invention. Channel pipeline 1062CH includes a line buffer 1062LB, an activation buffer 1062AB, a weight buffer 1062WB, a plurality of multipliers 1062X, a plurality of adders 1062P, a delay register 1062DR, and an internal accumulation register 1062NB.

Line buffer 1062LB stores activation data received from an activation feeder 1062AF. Line buffer 1062LB may include a shift register storing activation data as read by activation feeder 1062AF at one pixel per cycle.

Activation buffer 1062AB stores activation data received from line buffer 1062LB. Activation buffer 1062AB may include a set of registers storing activation data to which the current convolution computation is applied.

Weight buffer 1062WB stores weight values received from weight feeder 1062WF. Weight buffer 1062WB may include a shift register storing weight values to which the current convolution computation is applied.

Multipliers 1062X multiply the activation data from activation buffer 1062AB by the weight values from weight buffer 1062WB. In this embodiment there are three multipliers 1062X, meaning that the degree of parallelism in the width or height dimension of a convolution kernel is three. Adders 1062P, which collectively form an adder tree, then add together the products of the activation data and the weight values. During this process, delay register 1062DR, which is also considered part of the adder tree, balances the adder tree. Internal accumulation register 1062IA assists in the addition by storing partial sums. For example, internal accumulation register 1062IA may be used for accumulation of partial sums when the number of windows of the buffers, which is six in this embodiment, as well as width or height of convolution filter, is more than the degree of parallelism, which is three.

Once the products are all added together as a total sum, the total sum is output to an accumulation logic 1062A, which then stores the data in an accumulation memory, such as accumulation memory 264 of FIG. 2, through accumulation memory interface 1062AI.

Figure 11:
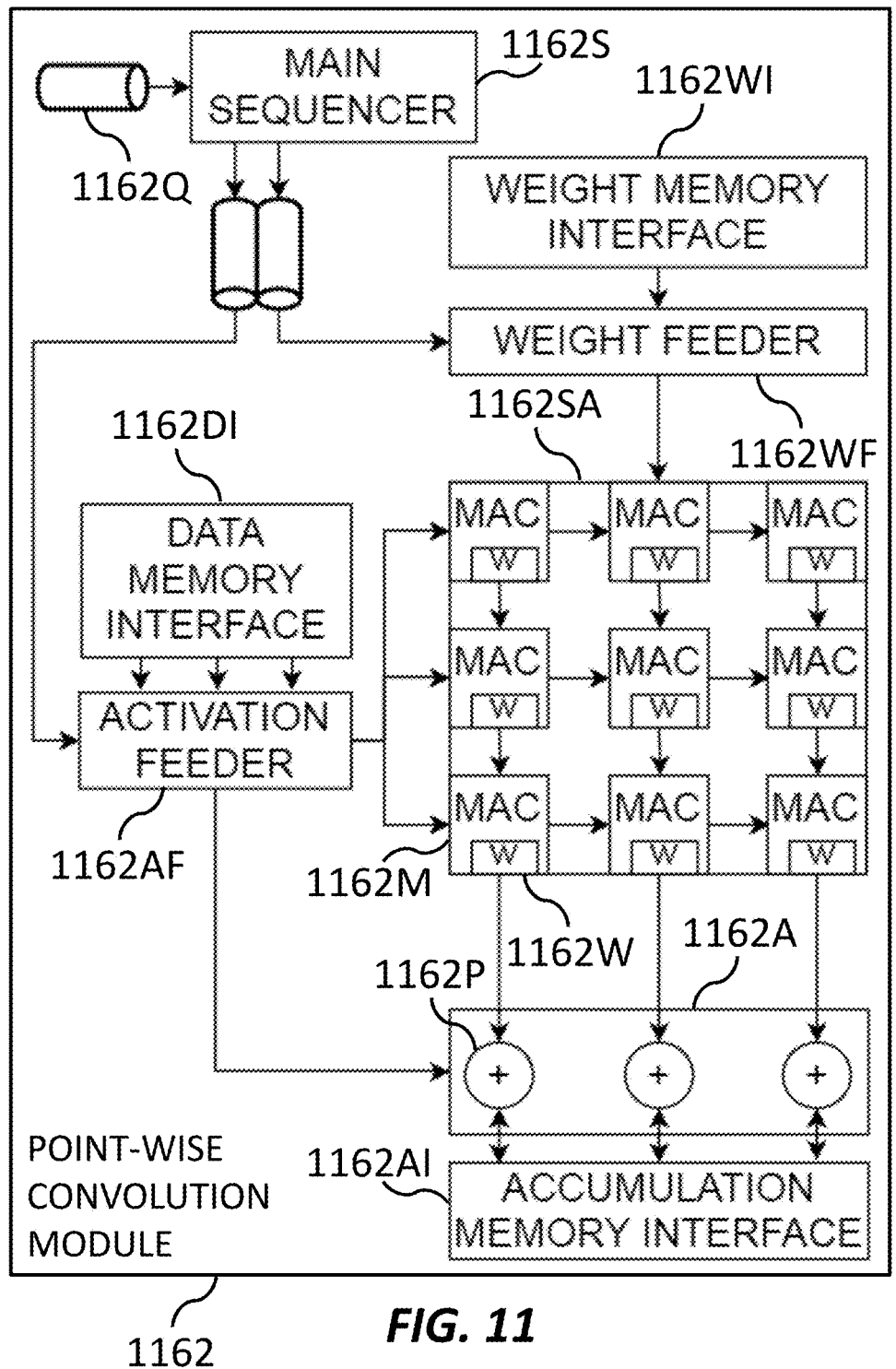
FIG. 11 shows an exemplary configuration of a point-wise convolution module, according to an embodiment of the present invention.

FIG. 11 shows an exemplary configuration of a point-wise convolution module 1162, according to an embodiment of the present invention. Point-wise convolution module 1162 includes queues 1162Q, a main sequencer 1162S, a weight memory interface 1162WI, a weight feeder 1162WF, a weight memory interface 1162WI, an activation feeder 1162AF, a data memory interface 1162DI, a systolic array 1162S, an accumulation logic 1162A, and an accumulation memory interface 1162AI.

Queue 1162Q receives and sends instructions. Queue 1162Q may receive instructions from an instruction DMA module, such as instruction DMA module of 256 of FIG. 2, and send the instructions to main sequencer 1162S. Queue 1162Q may be a FIFO memory or any other memory suitable for queueing instructions.

Main sequencer 1162S sequences control parameters for convolution. Main sequencer 1162S may receive instructions from queue 1162Q, and output a control sequence to weight feeder 1162WF and activation feeder 1162AF, each through a queue. In this embodiment, main sequencer 1162S splits KH×KW convolutions into a sequence of 1×1 convolutions, fed as control parameters into weight feeder 1162WF and activation feeder 1162AF.

Weight feeder 1162WF preloads weight values accessed from a weight memory, such as weight memory 255 of FIG. 2, through weight memory interface 1162WI to systolic array 1162SA in accordance with the activation data indicated in the control parameters from main sequencer 1162S.

Activation feeder 1162AF feeds activation data accessed from an activation data memory, such as activation data memory 260 of FIG. 2, through data memory interface 1162DI to systolic array 1162SA in accordance with the activation data indicated in the data sequence from main sequencer 1162S.

Systolic array 1162SA includes a plurality of MAC elements 1162M. Each MAC element 1162M is preloaded with a weight value from weight feeder 1162WF before computation starts, and then receives an activation value from activation feeder 1162F. To allow overlapping of computation and weight value preload, multiple weight buffers may be used. MAC elements 1162M are arranged in an array such that the product of the activation value and the weight output from preceding MAC elements 1162M is input to subsequent MAC elements 1162M. In this embodiment, for every cycle, each MAC element 1162M outputs an accumulation value equal to the value output from its left neighbor MAC element 1162M multiplied by the preloaded weight value 1162W, the product of which is added to the value output from its top neighbor MAC element 1162M. The MAC elements 1162M of the lowest row output their products to accumulation logic 1162A.

Accumulation logic 1162A receives products from systolic array 1162SA, and stores the products in an accumulation memory, such as accumulation memory 264 of FIG. 2. In this embodiment, if accumulation required by main Sequencer 1162S reads an old value in the memory location to be written, accumulation logic 1162A will overwrite it by sum with the new value. Otherwise, accumulation logic 1162A writes the new value as is.

Point-wise convolution module 1162 may be useful in performing point-wise convolution by splitting a single KH×KW convolution into multiple KH×KW 1×1 convolutions. For example, in a region of accumulation data memory, such as accumulation data memory 264 of FIG. 2, corresponding to four different 1×1 convolutions, 2×2 convolutions may be substituted. Point-wise convolution module 1162 may compute each 1×1 convolution as a dot product of the matrix of activation values in the MAC elements, and the matrix of weight values in the MAC elements, and then sum the results of the 1×1 convolutions.

Figure 12:
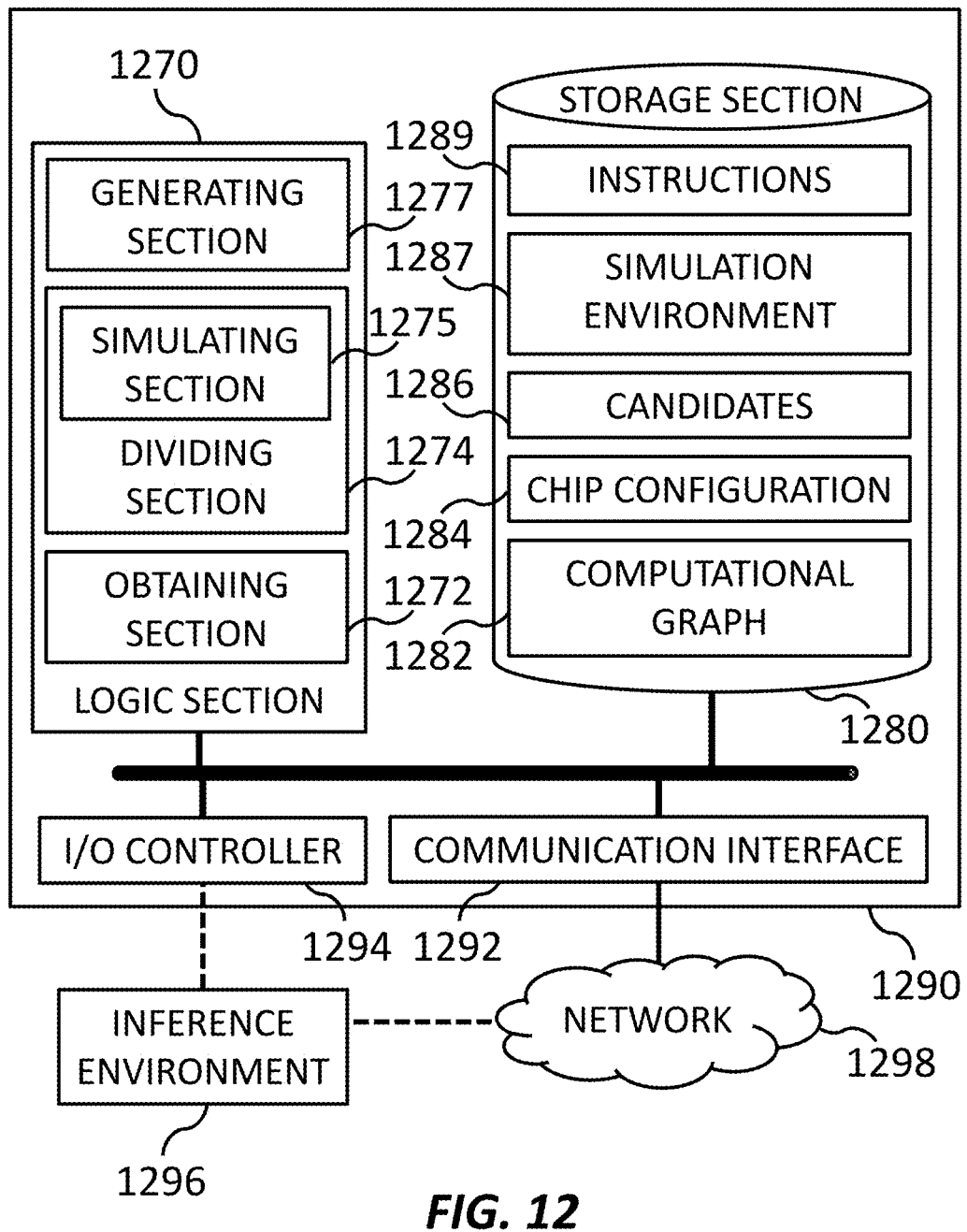
FIG. 12 shows an exemplary hardware configuration for hardware-specific division of inference, according to an embodiment of the present invention.

FIG. 12 shows an exemplary hardware configuration for hardware-specific division of inference, according to an embodiment of the present invention. The exemplary hardware configuration includes apparatus 1290, which communicates with network 1298, and interacts with inference environment 1296. Apparatus 1290 may be a host computer such as a server computer or a mainframe computer that executes an on-premise application and hosts client computers that use it, in which case apparatus 1290 may not be directly connected to inference environment 1296, but are connected through a terminal device through network 1298. Apparatus 1290 may be a computer system that includes two or more computers. Apparatus 1290 may be a personal computer that executes an application for a user of apparatus 1290.

Apparatus 1290 includes a logic section 1270, a storage section 1280, a communication interface 1292, and an input/output controller 1294. Logic section 1270 may be a computer program product including one or more computer readable storage mediums collectively storing program instructions that are executable by a processor or programmable circuitry to cause the processor or programmable circuitry to perform the operations of the various sections. Logic section 1270 may alternatively be analog or digital programmable circuitry, or any combination thereof. Logic section 1270 may be composed of physically separated storage or circuitry that interacts through communication. Storage section 1280 may be a non-volatile computer-readable medium capable of storing non-executable data for access by logic section 1270 during performance of the processes herein. Communication interface 1292 reads transmission data, which may be stored on a transmission buffering region provided in a recording medium, such as storage section 1280, and transmits the read transmission data to network 1298 or writes reception data received from network 1298 to a reception buffering region provided on the recording medium. Input/output controller 1294 connects to various input and output units, such as inference environment 1296, via a parallel port, a serial port, a keyboard port, a mouse port, a monitor port, and the like to accept commands and present information. Inference environment 1296 may be a hardware chip capable of performing neural network inference, such as hardware chip 250 of FIG. 2, or may be a computer or similar device with a processor and memory, such as a smartphone, smart car, etc., which also includes a hardware chip in communication with the memory.

Logic section 1270 includes obtaining section 1272, dividing section 1274, which includes simulating section 1275, and generating section 1277. Storage section 1280 includes computational graph 1282, hardware chip configuration 1284, candidates 1286, simulation environment 1287, and instructions 1289.

Obtaining section 1272 is the portion of logic section 1270 that obtains information for hardware-specific division of inference. For example, obtaining section 1272 may be configured to a computational graph and a hardware chip configuration. Obtaining section 1272 may store obtained information in storage section 1280 as computational graph

1282 and hardware chip configuration 1284. Obtaining section 1272 may include sub-sections for performing additional functions, as described in the foregoing flow charts. Such sub-sections may be referred to by a name associated with their function.

Dividing section 1274 is the portion of logic section 1270 that divides inference for hardware-specific division of inference. For example, dividing section 1274 may be configured to divide inference of a plurality of layers of a neural network into a plurality of groups, each group including a number of sequential layers based on an estimate of duration and energy consumption by a hardware chip to perform inference of the neural network. While dividing, dividing section 1274 may access computational graph 1282, hardware chip configuration 1284, and candidates 1286. Dividing section 1274 may include sub-sections for performing additional functions, as described in the foregoing flow charts. Such sub-sections may be referred to by a name associated with their function.

Simulating section 1275 is the portion of logic section 1270 that simulates a performance of inference of a neural network by a specific hardware chip. For example, simulating section 1275 may be configured to simulate a performance of inference of the neural network by the hardware chip to determine the estimate of duration and energy consumption of the hardware chip for each of a plurality of candidate group divisions. While simulating, simulating section 1275 may access computational graph 1282, hardware chip configuration 1284, candidates 1286, simulation environment 1287, and instructions 1289. Simulating section 1275 may include sub-sections for performing additional functions, as described in the foregoing flow charts. Such sub-sections may be referred to by a name associated with their function.

Generating section 1277 is the portion of logic section 1270 that generates instructions for hardware-specific division of inference. For example, generating section 1277 may be configured to generate instructions for the hardware chip to perform inference of the neural network, sequentially by group, of the plurality of groups. The instructions may be used for simulation, such as by simulating section 1275, or may be used directly on the hardware chip. While generating instructions, generating section 1277 may access computational graph 1282, hardware chip configuration 1284, candidates 1286, and instructions 1289. Generating section 1277 may include sub-sections for performing additional functions, as described in the foregoing flow charts. Such sub-sections may be referred to by a name associated with their function.

In other embodiments, the apparatus may be any other device capable of processing logical functions in order to perform the processes herein. The apparatus may not need to be connected to a network in environments where the input, output, and all information is directly connected. The logic section and the storage section need not be entirely separate devices, but may share one or more computer-readable mediums. For example, the storage section may be a hard drive storing both the computer-executable instructions and the data accessed by the logic section, and the logic section may be a combination of a central processing unit (CPU) and random access memory (RAM), in which the computer-executable instructions may be copied in whole or in part for execution by the CPU during performance of the processes herein.

In embodiments where the apparatus is a computer, a program that is installed in the computer can cause the computer to function as or perform operations associated with apparatuses of the embodiments of the present invention or one or more sections (including modules, components, elements, etc.) thereof, and/or cause the computer to perform processes of the embodiments of the present invention or steps thereof. Such a program may be executed by a processor to cause the computer to perform certain operations associated with some or all of the blocks of flowcharts and block diagrams described herein.

Various embodiments of the present invention may be described with reference to flowcharts and block diagrams whose blocks may represent (1) steps of processes in which operations are performed or (2) sections of apparatuses responsible for performing operations. Certain steps and sections may be implemented by dedicated circuitry, programmable circuitry supplied with computer-readable instructions stored on computer-readable media, and/or processors supplied with computer-readable instructions stored on computer-readable media. Dedicated circuitry may include digital and/or analog hardware circuits and may include integrated circuits (IC) and/or discrete circuits. Programmable circuitry may include reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A computer-readable storage medium including instructions that are executable by a computer to cause the computer to perform operations comprising:
    obtaining a computational graph and a configuration of a hardware chip,
        the computational graph of a neural network having a plurality of layers, each layer having a plurality of nodes and a plurality of edges, each node including a representation of a mathematical operation;
        the configuration of the hardware chip including at least one module for performing the mathematical operations and an on-chip memory, the hardware chip operable to perform inference of the neural network in portions of each layer by performing the mathematical operations on activation data, sequentially by layer, of corresponding portions of layers while interfacing with an external memory storing the activation data;
    dividing inference of the plurality of layers into a plurality of groups, each group including a number of sequential layers based on an estimate of duration and energy consumption by the hardware chip to perform inference of the neural network by performing the mathematical operations, sequentially by layer, of corresponding portions of layers of each group, the dividing inference further including
        simulating a performance of inference of the neural network by the hardware chip to determine the estimate of duration and energy consumption of the hardware chip for each of a plurality of candidate group divisions, each candidate group division identifying a unique division of the plurality of layers, and
        comparing the estimate of duration and energy consumption of each candidate group division of the same layers among the plurality of layers; and
    generating instructions for the hardware chip to perform inference of the neural network, sequentially by group, of the plurality of groups.

2. The computer-readable storage medium of claim 1, wherein each of the plurality of candidate group divisions identify even divisions of the plurality of layers.

3. The computer-readable storage medium of claim 1, wherein the dividing inference further includes:
    the plurality of candidate group divisions identify a single layer as a first candidate group division, a preceding group of layers as a second group division, and the single layer together with the preceding group of layers as a third candidate group division,
    the comparing includes comparing (i) an estimate of duration and energy consumption to perform the mathematical operations of the third candidate group division and (ii) an estimate of total duration and total energy consumption to perform the mathematical operations of the first candidate group division and the second candidate group division.

4. The computer-readable storage medium of claim 1, wherein the simulating includes
    generating instructions for the hardware chip to perform the mathematical operations, sequentially by layer, of corresponding portions in layers of each group,
    executing the instructions on a simulation of the hardware chip while identifying operations of each clock cycle, wherein the estimate of energy consumption of the hardware chip is based on a sum of individual energy consumptions associated with each operation, and the estimate of duration is based on the number of clock cycles.

5. The computer-readable storage medium of claim 1, further comprising determining dimensions of the portions of each layer by:
    simulating a performance of inference of the neural network by the hardware chip to determine the estimate of duration and energy consumption of the hardware chip for each of a plurality of candidate dimension specifications, each candidate dimension specification based on a capacity of the on-chip memory and a degree of parallelism of the hardware chip, and
    comparing the estimate of duration and energy consumption of each candidate dimension specification.

6. The computer-readable storage medium of claim 1, wherein the neural network is a convolutional neural network, and
the portions of each layer are tiles, and the at least one module of the hardware chip includes at
least one convolution module.

7. The computer-readable storage medium of claim 6,
wherein the at least one convolution module includes at least
one dedicated depth-wise convolution module and at least
one point-wise convolution module.

8. The computer-readable storage medium of claim 6,
wherein the at least one module further includes at least one
module for performing activation operations, at least one
module for loading the activation data from the external
memory onto the on-chip memory, at least one module for
storing activation data to the external memory from the
on-chip memory, and at least one module for loading
weights of the convolution neural network from the external
memory to the on-chip memory.

9. The computer-readable storage medium of claim 1,
wherein the generating instructions for the hardware chip
further includes generating instructions for the hardware
chip to:
retrieve activation data of corresponding portions in the
first layer in each group from the external memory, and
record activation data resulting from the mathematical
operations of corresponding portions in the last layer in
each group to an external memory.

10. The computer-readable storage medium of claim 1,
wherein the generating instructions for the hardware chip
further includes:
assigning each operation to a queue among a plurality of
queues, and
ordering execution of operations in each queue.

11. The computer-readable storage medium of claim 1,
wherein the generating instructions for the hardware chip
further includes:
allocating locations in the on-chip memory to data for
performing inference of the neural network, and
scheduling evacuation of data to the external memory in
order to perform inference of the neural network.

12. The computer-readable storage medium of claim 11,
wherein the generating instructions includes generating
instructions for the at least one module of the hardware chip
to perform loading of data from the external memory to the
allocated locations.

13. The computer-readable storage medium of claim 1,
wherein the generating instructions for the hardware chip
further includes synchronization flag annotating to preserve
mutual ordering of dependent operations.

14. The computer-readable storage medium of claim 1,
wherein the generating instructions for the hardware chip
further includes converting instructions into binary representation.

15. The computer-readable storage medium of claim 1,
wherein
the hardware chip further includes a plurality of cores, the
at least one module for performing the mathematical
operations and the on-chip memory being distributed
among the plurality of cores,
each core includes at least one transmitter block and at
least one receiver block configured for inter-core communication, and
the generating instructions for the hardware chip further
includes distributing instructions among the cores.

16. The computer-readable storage medium of claim 1,
wherein the configuration of the hardware chip further
includes at least one transmitter block and at least one
receiver block configured to communication with a second
instance of the hardware chip of a multi-chip configuration.

17. A computer-implemented method comprising:
obtaining a computational graph and a configuration of a
hardware chip,
the computational graph of a neural network having a
plurality of layers, each layer having a plurality of
nodes and a plurality of edges, each node including
a representation of a mathematical operation;
the configuration of the hardware chip including at least
one module for performing the mathematical operations and an on-chip memory, the hardware chip
operable to perform inference of the neural network
in portions of each layer by performing the mathematical operations on activation data, sequentially
by layer, of corresponding portions of layers while
interfacing with an external memory storing the
activation data;
dividing inference of the plurality of layers into a plurality
of groups, each group including a number of sequential
layers based on an estimate of duration and energy
consumption by the hardware chip to perform inference
of the neural network by performing the mathematical
operations, sequentially by layer, of corresponding
portions of layers of each group, the dividing inference
further including
simulating a performance of inference of the neural
network by the hardware chip to determine the
estimate of duration and energy consumption of the
hardware chip for each of a plurality of candidate
group divisions, each candidate group division identifying a unique division of the plurality of layers,
and
comparing the estimate of duration and energy consumption of each candidate group division of the
same layers among the plurality of layers; and
generating instructions for the hardware chip to perform
inference of the convolutional neural network, sequentially by group, of the plurality of groups.

18. An apparatus comprising:
an obtaining section configured to obtain a computational
graph and a configuration of a hardware chip,
the computational graph of a neural network having a
plurality of layers, each layer having a plurality of
nodes and a plurality of edges, each node including
a representation of a mathematical operation;
the configuration of the hardware chip including at least
one module for performing the mathematical operations and an on-chip memory, the hardware chip
operable to perform inference of the neural network
in portions of each layer by performing the mathematical operations on activation data, sequentially
by layer, of corresponding portions of layers while
interfacing with an external memory storing the
activation data;
a dividing section configured to divide inference of the
plurality of layers into a plurality of groups, each group
including a number of sequential layers based on an
estimate of duration and energy consumption by the
hardware chip to perform inference of the neural network by performing the mathematical operations,
sequentially by layer, of corresponding portions of
layers of each group, the dividing section further configured to
simulate a performance of inference of the neural
network by the hardware chip to determine the
estimate of duration and energy consumption of the hardware chip for each of a plurality of candidate group divisions, each candidate group division identifying a unique division of the plurality of layers, and compare the estimate of duration and energy consumption of each candidate group division of the same layers among the plurality of layers; and a generating section configured to generate instructions for the hardware chip to perform inference of the convolutional neural network, sequentially by group, of the plurality of groups.

* * * * *